T. GRAY.
CHARGING TRUCK.
APPLICATION FILED DEC. 4, 1911. RENEWED NOV. 4, 1915.

1,164,640.

Patented Dec. 21, 1915.
2 SHEETS—SHEET 1.

WITNESSES:
Walter A. Kelley.
Bessie E. Dempsey.

INVENTOR
Thomas Gray
BY J. W. McEllis
ATTORNEY.

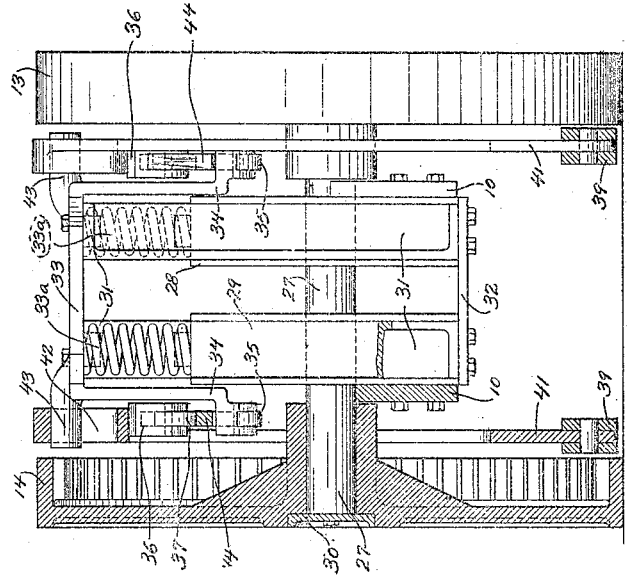

UNITED STATES PATENT OFFICE.

THOMAS GRAY, OF BUFFALO, NEW YORK.

CHARGING-TRUCK.

1,164,640. Specification of Letters Patent. Patented Dec. 21, 1915.

Application filed December 4, 1911, Serial No. 663,867. Renewed November 4, 1915. Serial No. 59,698.

*To all whom it may concern:*

Be it known that I, THOMAS GRAY, a citizen of the Dominion of Canada, residing at Buffalo, county of Erie, and State of New York, have invented certain new and useful Improvements in Charging-Trucks, of which the following is a full, clear, and exact description.

My invention relates generally to trucks used for charging annealing furnaces.

In most of the trucks of the prior art either steam or compressed air has been used as the source of motive power which gives rise to many inconvenient and disagreeable features apparent to those skilled in the art.

I prefer to operate my truck by electric power and in producing my invention I have provided a charging truck which is cheap to manufacture and cheap and convenient to operate. With my truck there is no steam boiler to obstruct the view of the operator, and no escaping steam to bother or inconvenience him when the charge is run into the furnace and let down. Furthermore, my truck, in its preferred construction, carries its own source of power and is a complete independent power unit and therefore does not require a hose or like conductor to connect it with the source of power. Obviously, if desired, I may dispense with the electric storage battery and run a flexible electric conductor from my truck to any stationary and conveniently arranged source of electric power. Moreover, my truck is already for service at a minute's notice without having to get up steam or compressed air and when not in use whether for a short or long time, all expense ceases.

Figure 1:
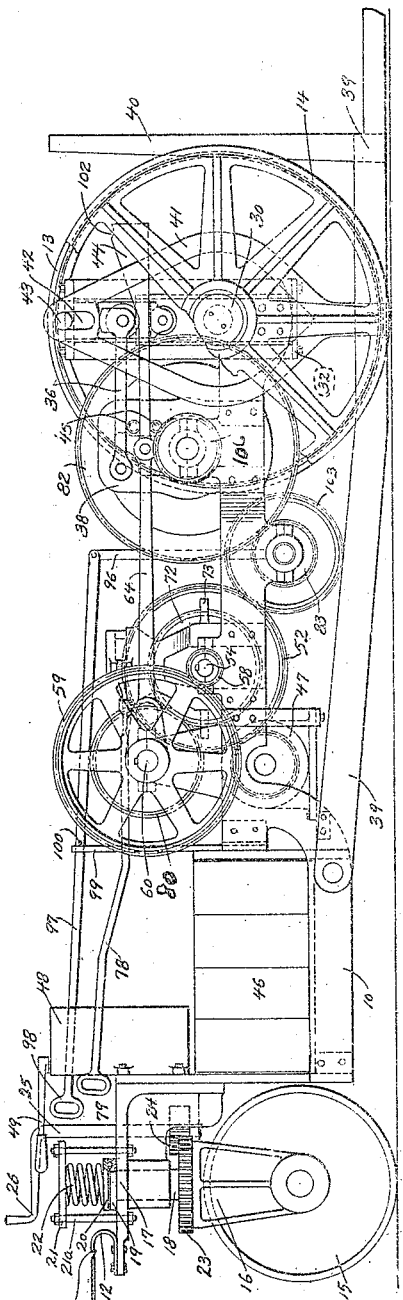
Figure 2:
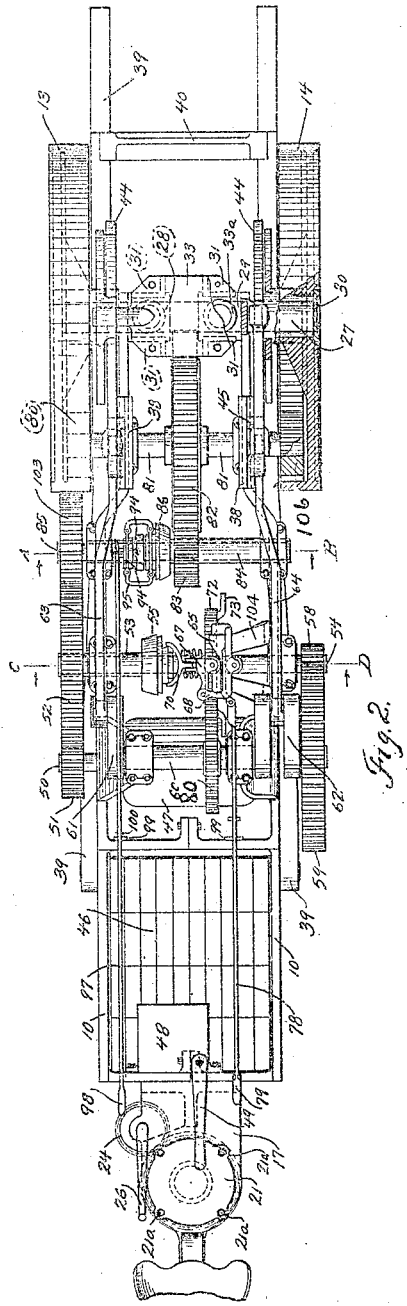

Reference is to be had to the accompanying drawings, forming part of this specification, in which like characters of reference indicate like parts throughout the several views of which:

Figure 1 is a side view of my truck with a portion of one of the wheels broken away. Fig. 2 is a plan view of my invention with a portion thereof broken away. Fig. 3 is a front view of my truck showing a portion thereof in section. Fig. 4 is a sectional view taken on line A—B of Fig. 2. Fig. 5 is a sectional view taken on line C—D of Fig. 2.

Fig. 6 is a perspective view of the clutch operating wedge used in my device.

Referring now to the drawings, 10 represents the frame of my truck which is preferably made in two parts. These two parts are secured together by any of the well known means. This frame is carried by two driving wheels 13 and 14 and one steering wheel 15.

17 is a bracket which is secured to the rear end of the frame 10 and overhangs the steering wheel 15. The said steering wheel is rotatably carried by a fork 16, at the rear end of the frame. Secured to the top of the fork and rotatably and slidably carried by the bracket 17 is a stem 18. This stem extends up through the bearing on the bracket 17 and has secured to its upper end a flange 19 provided with a ball race. A disk 20 provided with a similar ball race is disposed above the said flange 19 and between it and said disk is a series of balls. Carried at some distance above said disk is a thrust disk 21 which is held in place by means of the bolts 21ª. A helical spring 22 is disposed between said thrust disk and the disk 20, thus serving to keep the stem 18 normally in its lowermost position except when the steering wheel is given a jolt, whereupon the said spring will yield. Rigidly carried by the crown of the fork 16 is a spur gear 23. Meshing with this spur gear is a spur gear pinion 24. This pinion has a wider face than the spur gear 23, thus permitting a longitudinally relative movement. The said pinion is secured to a shaft 25 which is suitably carried by the bracket 17. The shaft 25 is provided at its upper end with a crank 26 by which the pinion carried by said shaft may be revolved and thus steer the truck. A seat 11 is suitably supported on a spring 12 which is secured to the bracket 17.

The driving wheels 13 and 14 are rotatably disposed upon a stationary shaft 27. This shaft has rigidly mounted thereon, blocks 28 and 29 and to these blocks are secured the front ends of the frame 10. The wheels 13 and 14 each have a recess in the outer face of the hub and in this recess is disposed a flange 30 which is secured to the end of the stationary shaft 27, thus keeping the said wheels in place on said shaft. In the front and back face of each of the blocks 28 and 29 is provided a groove as shown and slidably disposed in these grooves are slides 31. These slides are longer than the blocks 28 and 29 and a plate 32 secures the bottom ends thereof together. Disposed at the top ends of the said slides is a yoke 33 which is suitably bolted to the said ends. A spring 33ª is disposed between the yoke 33 and each of the blocks 28 and 29 and normally hold the slides 31 in their uppermost position. At each end of the yoke 33 is a downwardly extending L-shaped arm 34, each carrying at its lower end a roller 35. Above the lower leg of each of the L-shaped arms 34 is disposed the outer end of a roller arm 36. Each of said roller arms carries a roller 37. The rear end of each of the said roller arms is pivotally carried by a support 38, one of said supports being secured to each side of the frame 10 as shown.

A lifting frame or fork 39 is carried by the frame 10 and is pivoted at its rear end to said frame at preferably some point near the rear of the truck. This fork extends forwardly for some distance beyond the driving wheels 13 and 14 and is supported between the same. Extending across the front end of said fork is a vertical back or support 40 which is properly secured to the said fork and which prevents the annealing pots from tipping over when the truck is moved about. To each side of the lifting frame or fork 39 is pivotally attached the lower end of one of the fork supporters 41. These fork supporters extend upwardly and are so formed that they pass around the central hub of the driving wheel and other mechanism located on the vertical centerline. At the upper end of each of the said fork supporters is provided an elongated aperture or slot 42 in each of which is slidably disposed one of the bearing pins 43. The said bearing pins are made preferably integral with the yoke 33 and serve to keep the fork supporters in their proper position as they are moved up and down. The upper end or head of each of these fork supporters is greater in width than the lower portion and directly beneath the said head on each of said fork supporters is disposed the outer end of one of the roller arms 36. The said roller arms are each provided with a head, thus providing a suitable bearing for each of said fork supporters. Between the roller 35 of each of the L-shaped arms 34 and the roller 37 of each of the roller arms 36 is disposed a lifting wedge 44 for increasing the distance between said rollers. The rear end of each of the said wedges is carried between suitable rollers 45 carried by the support 38 and when the lifting frame or fork is to be operated these wedges are moved longitudinally by means hereinafter described. At the summit of each of said wedges is provided an indentation 102 which engages with the roller 37 carried by each roller arm 36 when the said wedges are drawn back, thus temporarily locking the said wedges when the lifting frame is carrying a load.

As hereinbefore stated, I use electricity as the source of motive power for my truck and in the drawings I have represented, in a diagrammatical manner, an electric storage battery 46 and an electric motor 47.

48 is the electric controller and 49 the operating lever of the same.

Suitable electric connections (not shown) are made between the battery motor and controller. The said battery motor and controller are suitably secured to and carried by the frame 10. One end of the shaft 50 of the motor 47 extends out beyond the side of the frame as shown (Fig. 2) and has a spur gear pinion 51 secured thereon. Meshing with the pinion is a spur gear 52 which is mounted rigidly upon the outer end of a hollow shaft or sleeve 53. Rotatably disposed within the said sleeve is a shaft 54. This shaft and sleeve are rotatably carried by the frame 10 in suitable bearings as shown. Connecting the sleeve 53 with the shaft 54 is a wedge operating clutch 55. The female member 56 of the clutch is rigidly mounted on the inner end of the said sleeve and the male member 57 thereof is slidably mounted on the said shaft 54 and engageable with said female member. Rigidly mounted on the outer end of the shaft 54 is a pinion 58 which meshes with a crank-shaft spur gear 59. This spur gear is rigidly mounted on the outer end of the crank-shaft 60 which is rotatably disposed in suitable bearings carried by the frame 10. This crank-shaft is provided with a crank 61 at one end and a crank 62 near its opposite end and immediately behind the spur gear 59. The rear ends of the connecting rods 63 and 64 are rotatably connected to the crank shafts 61 and 62, respectively. The front ends of said connecting rods are each connected to one of the lifting wedges 44. Thus by revolving the crank-shaft 60 the said wedges are operated to either raise or lower the lifting frame or fork 39. I have found that it is necessary when operating the said wedges to provide some means for automatically throwing the wedge operating clutch out of engagement at predetermined positions and thus stopping the revolution of the crank-shaft 60. I accomplish this by the mechanism which I will now describe.

Carried by the frame 10 (Figs. 2 and 5) is a supporting member 104 which straddles the shaft 54 and carries at its upper end a roller 105. Bearing against the roller 105 and slidably disposed in the said supporting member is an operating wedge 65. Bearing against the opposite side of the wedge 65 is a roller 66 which is carried by a roller arm 67. This roller arm is pivotally carried by the arms 68 of the supporting member 104. The said supporting member is provided with arms 69 between which is pivotally mounted a clutch operating lever 70. The upper end of this lever is in contact with the outer end of the roller arm 67 and the lower end of said lever is forked and in engagement with an annular groove 71 provided in the male clutch member 57. Rotatably mounted on the shaft 54 and disposed beneath the wedge 65 is a clutch operating gear 72. This gear meshes with a spur gear 80 of the same diameter, which is rigidly mounted upon the crank-shaft 60. The gear 72 is provided with two fingers 73 which are set diametrically opposite each other and arranged to pass through a slot 74 provided in the supporting member 104 when the said gear is revolved. When the said gear is revolving, the clutch 55 is of course, in engagement and the wedge is then in the position shown. The wedge 65 is provided on its under side with a notch 75 (Fig. 6) and when either of the fingers 73 passes through the slot 74 they engage with the said notch and move the wedge so as to disengage the clutch 55. A helical spring 76 is disposed around the shaft 54 and between the gear 72 and the male member 57 of the clutch. This spring serves to press the clutch members into engagement when the wedge is pushed forward. The wedge 65 is provided with a bifurcated end 77 which has pivotally connected thereto an operating lever 78. The operating lever is provided at the rear end thereof with a suitable handle 79 which is conveniently located for the operator.

The propelling mechanism of my truck is as follows: The inner face of each of the driving wheels 13 and 14 is provided with spur gear teeth and meshing with these teeth of each of said wheels is a driving pinion 106. Each of said pinions is mounted on one end of the differential shaft 81 which is suitably carried in bearings by the frame 10. Mounted on the said differential shaft and located near the center of the frame 10 is the differential gearing 82. This differential gearing is of the usual type and need not here be described in detail. Meshing with the said differential gearing is a pinion 83 which is rigidly mounted upon a tubular shaft 84 (Fig. 4). Within this tubular shaft is rotatably mounted a shaft 85. The said tubular shaft 84 and shaft 85 are rotatably carried by the frame 10 in suitable bearings as shown. A driving clutch 86 is provided by which the said shaft 85 is engageable with the tubular shaft 84. The female member 87 of the said clutch is rigidly secured to the tubular shaft 84 and the male member 88 thereof is slidably disposed on the shaft 85. In the bearing 89 (Fig. 4) is disposed, in a fixed position, a sleeve 90. This sleeve is flanged at both ends as shown, and extends inwardly toward the clutch 86. A roller flange 91 is rigidly mounted on the inner end of said sleeve. This roller flange is provided with two rollers 92, disposed preferably diametrically opposite each other, and they extend from the face of said flange which is toward the bearing 89. An operating flange 93 is rotatably disposed upon the sleeve 90 and has one of its faces bearing against the rollers 92. In the face of the operating flange which bears against the rollers 92 are provided notches 94 which are engageable with the said rollers when the operating flange is revolved. Connecting the male members 88 of the operating clutch with the operating flange 93 is a transverse yoke 95 (Figs. 2 and 4). The said clutch member and said flange are each provided with an annular groove and the said yoke is rotatably engaged with said groove. A lever 96 is rigidly connected with said operating flange and extends upwardly, having pivotally connected at its upper end an operating link 97. A suitable handle 98 is provided on the inner end of said operating link which is conveniently located for the operator. Standards 99 are secured to the frame of the truck and in these supports the respective operating lever 78 and link 97 are slidably disposed. A stop 100 is preferably provided on the operating link 97 to limit the movement thereof. A helical spring 101 is arranged around the sleeve 90 and bears against the bearing 89 and the operating flange. The shaft 85 is driven by means of a spur gear 103 which is rigidly secured to the outer end thereof and which meshes with the spur gear 52.

Having thus described my invention, I will now describe its operation.

When it is desired to propel my truck, the motor 47 is set in motion. The power derived therefrom is carried to the shaft 85 by the gears hereinbefore described. The operator now pushes the operating link 97 forward. This, through the medium of the lever 96, revolves the operating flange 93 thus permitting the notches 94 to engage with the rollers 92. The said operating flange and the male member 88 of the operating clutch are now given a longitudinal movement by the spring 101 and thus throw the said clutch into engagement. To reverse the direction of travel of the truck, the direction of rotation of the motor is reversed.

The wedge operating clutch 55 for convenience in the drawing, is shown in engagement, but obviously the clutch is normally out of engagement. To engage this clutch and set the parts as shown, it is only necessary for the operator to push the operating lever 78 forward. When the clutch parts are in the positions shown the crank-shaft 60 will be rotated, but as the shaft revolves the gear 80 mounted thereon also revolves. This gear 80, as hereinbefore stated, meshes with the clutch operating gear 72 and when the clutch operating gear is revolved one of the fingers 73 carried thereby engages with the notch 75 provided on the wedge 65 and pushes the said wedge rearwardly. When the said wedge is moved as just described the roller arm 67 is given a swinging movement which, through the medium of the clutch operating lever 70, throws the clutch 55 out of engagement. When the said crank-shaft 60 is rotated from the position shown, the wedges 44 are drawn backwardly until the indentation 102 in the summit of each is directly beneath one of the rollers 37 carried by the roller arms 36, at which time the clutch 55 is automatically disengaged. It will be understood, that the release of the clutch 55 is so timed that it is disengaged shortly before the lifting wedges 44 and the rotating parts of the device have come to rest, when the lifting wedges are operated in either direction. Thus, after the clutch is disengaged, there is sufficient momentum of the rotating parts to carry either of the fingers 73 far enough, so as to be out of engagement with the notch 75, whereupon the wedge 65 may be again operated to throw the clutch into engagement when desired. When the wedges are in the position just described the lifting frame or fork 39 is in its raised position. When it is desired to lower the said fork the crank-shaft 60 is again revolved which pushes the said wedges 44 forwardly. The said crank-shaft is stopped automatically when the said wedges reach the limit of their forward movement or when the said fork is in its lowermost position.

It should be understood that instead of the electric power means herein specifically described, other suitable power means such as an internal combustion engine may be employed in my truck and substantially the same advantages may thus be attained as those herein set forth. Clearly too, a cam or eccentric could be advantageously used in my device in place of the specific wedge construction shown and described. Other detailed modifications of the device herein shown and described may be made without departing from the spirit of my invention and I do not wish to be limited to the exact embodiment herein shown and described.

Having thus described my invention, what I claim is:

1. In a charging truck, the combination with a frame, driving wheels for said truck and a lifting frame pivoted to said frame; of motive power means carried by said frame, clutch controlled means connected to said lifting frame and said power means for lifting and lowering said lifting frame by power, and means for automatically disengaging said clutch controlled means at any predetermined point in the travel of said lifting frame.

2. In a charging truck, the combination with a frame, driving wheels for said truck and a lifting frame pivoted to said frame; of motive power means carried by said frame, clutch controlled means connecting said power means with said lifting frame, clutch controlled means connecting said power means with said driving wheels, and means for automatically disengaging said first mentioned clutch controlled means at any predetermined point in the travel of said lifting frame.

3. In a charging truck, the combination with a frame, driving wheels for said truck and a lifting frame pivoted to said frame; of motive power means carried by said frame, lifting means, means connecting said lifting frame and said lifting means, clutch controlled means for connecting said lifting means with said motive power, and means for automatically disengaging said clutch controlled means at any predetermined point in the travel of said lifting frame.

4. In a charging truck, the combination with a frame, driving wheels and a steering wheel for said truck, and a lifting frame pivoted to said frame; of motive power means carried by said frame, wedge-shaped lifting means, means connecting said lifting frame and said lifting means and clutch controlled means for connecting said lifting means with said motive power.

5. In a charging truck, the combination with a frame, driving wheels and a steering wheel for said truck and a lifting frame pivoted to said frame; of motive power means carried by said frame, lifting wedges, means connecting said lifting wedges with said lifting frame and clutch controlled means for connecting said wedges with said power means.

6. In a charging truck, the combination with a frame, driving wheels for said truck and a lifting frame pivoted to said frame; of motive power means carried by said frame, lifting means, means connecting said lifting means with said lifting frame, clutch controlled means for connecting said lifting means with said power means and automatic means governing said clutch controlled means.

7. In a charging truck, the combination with motive power means, of a lifting frame, lifting means pivoted to said frame, means connecting said lifting means with said lifting frame and clutch controlled operating mechanism for connecting said lifting means with said power means, said clutch operating mechanism comprising means for throwing the clutch into engagement, and automatic tripping means for throwing the clutch out of engagement.

8. In a power driven vehicle, a clutch operating mechanism comprising, manual means for throwing the clutch into engagement, a movable member and automatic tripping means actuating said movable member to throw said clutch out of engagement.

9. In a power driven vehicle, a clutch operating mechanism comprising, a spring adapted to press the clutch into engagement, a movable member, means connecting said movable member with the clutch for normally holding said clutch out of engagement, manually operated means for releasing the normally disengaged clutch member and automatic tripping means for throwing the clutch out of engagement.

10. In a charging truck, the combination with a frame, driving wheels and a steering wheel for said truck and a lifting frame pivoted to said frame; of an electric motor carried by said frame, a source of electric power, clutch controlled means connecting said electric motor with said lifting frame, clutch controlled means connecting said electric motor with said driving wheels, and means for automatically disengaging said first mentioned clutch controlled means at any predetermined point in the travel of said lifting frame.

11. In a charging truck, the combination with a frame, driving wheels and a steering wheel for said truck and a lifting frame pivoted to said frame; of an electric motor carried by said frame, a source of electric power, wedge-shaped lifting means, means connecting said lifting frame and said lifting means and clutch controlled means for connecting said lifting means to said motor.

12. In a charging truck, the combination with a frame, driving wheels and a steering wheel for said truck and a lifting frame pivoted to said frame; of motive power means carried by said frame, a source of electric power, lifting wedges, means connecting said lifting wedges with said lifting frame, and clutch controlled means for connecting said wedges to said power means.

13. In a charging truck, the combination with a frame, driving wheels and a steering wheel for said truck and a lifting frame pivoted to said frame; of an electric motor carried by said frame, a source of electric power, wedge-shaped lifting means, means connecting said lifting frame and said lifting means, clutch controlled means for connecting said lifting means to said motor and clutch controlled means connecting said electric motor with said driving wheels.

14. In a charging truck, the combination with a frame, driving wheels and a steering wheel for said truck and a lifting frame pivoted to said frame; of an electric motor carried by said frame, a source of electric power, lifting means, means connecting said lifting frame, said lifting means and clutch controlled means for connecting said lifting means to said motor, and means for automatically disengaging said clutch controlled means at any predetermined point in the travel of said lifting frame.

15. In a charging truck, the combination with a frame, driving wheels and a steering wheel for said truck and a lifting frame pivoted to said frame; of an electric motor carried by said frame, a source of electric power, lifting means, means connecting said lifting frame and said lifting means, clutch controlled means for connecting said lifting means to said motor, clutch controlled means connecting said electric motor with said driving wheels, and means for automatically disengaging said first mentioned clutch controlled means at any predetermined point in the travel of said lifting frame.

16. In a charging truck, the combination with a frame, driving wheels and a steering wheel for said truck and a lifting frame pivoted to said frame; of an electric motor carried by said frame, a source of electric power, lifting wedges, means connecting said lifting wedges with said lifting frame, clutch controlled means for connecting said wedges to said electric motor and automatic means governing said clutch controlled means.

17. In a charging truck, the combination with a frame, driving wheels and a steering wheel for said truck and a lifting frame pivoted to said frame; of an electric motor carried by said frame, a source of electric power, lifting wedges, means connecting said lifting wedges with said lifting frame, a crank-shaft driven by said motor, means connecting said crank-shaft with said wedges, a wedge operating clutch between said crank-shaft and said motor, means for manually engaging said clutch and automatic means for disengaging said clutch.

18. In a charging truck, the combination with a frame, driving wheels and a steering wheel for said truck and a lifting frame pivoted to said frame; of an electric motor carried by said frame, a source of electric power, lifting wedges, lifting frame supports connected with said lifting frame and adapted to be raised and lowered by said wedges, a crank-shaft driven by said motor, means connecting said crank-shaft with said wedges, a wedge operating clutch between said crank-shaft and said motor, means for manually engaging said clutch, automatic means for disengaging said clutch and clutch controlled means connecting said electric motor with said driving wheels.

19. In a charging truck, the combination with a frame, driving wheels and a steering wheel for said truck and a lifting frame pivoted to said frame; of an electric motor carried by said frame, a source of electric power and clutch controlled means connecting said lifting frame with said electric motor, comprising lifting wedges, means connecting said lifting wedges with said frame, an intermediate shaft and tubular shaft, a clutch connecting said intermediate shaft and said tubular shaft, a crank-shaft driven by said motor, gearing connecting said motor with said tubular shaft, gearing connecting said intermediate shaft with said crank-shaft, a supporting member, a clutch operating wedge carried by said member, a roller arm engageable with said wedge, a clutch operating lever connecting said roller arm with said clutch, manual means for engaging said clutch and means carried by said crank-shaft and said intermediate shaft for automatically disengaging said clutch.

20. In a charging truck, the combination with a frame, driving wheels and a steering wheel for said truck and a lifting frame pivoted to said frame; of an electric motor carried by said frame, a source of electric power, of clutch controlled means connecting said electric motor with said driving wheels and clutch controlled means connecting said lifting frame with said electric motor, comprising lifting wedges, means connecting said lifting wedges with said frame, an intermediate shaft and tubular shaft, a clutch connecting said intermediate shaft and said tubular shaft, a crank-shaft driven by said motor, gearing connecting said motor with said tubular shaft, gearing connecting said intermediate shaft with said crank-shaft, a supporting member, a clutch operating wedge carried by said member, a roller arm engageable with said wedge, a clutch operating lever connecting said roller arm with said clutch, manual means for engaging said clutch and means carried by said crank-shaft and said intermediate shaft for automatically disengaging said clutch.

21. In a charging truck, the combination with a frame, driving wheels provided with internal gear teeth for said frame, a steering wheel for said frame and a lifting frame; of an electric motor carried by said frame, a source of electric power and clutch controlled means connecting said driving wheels with said motor comprising a differential shaft, pinions carried by said differential shaft and engageable with said driving wheels, differential gearing on said differential shaft, a solid shaft and a tubular shaft carried by said frame, a pinion carried by said tubular shaft and meshing with said differential gearing, gearing connecting said solid shaft with said motor, a clutch connecting said solid shaft and said tubular shaft and manual means for operating said clutch.

22. In a charging truck, the combination with a frame, driving wheels provided with internal gear teeth for said frame, a steering wheel for said frame and a lifting frame; of an electric motor carried by said frame, a source of electric power and clutch controlled means connecting said driving wheels with said motor comprising a differential shaft, pinions carried by said differential shaft and engageable with said driving wheels, differential gearing on said differential shaft, a solid shaft and a tubular shaft carried by said frame, a pinion carried by said tubular shaft and meshing with said differential gearing, gearing connecting said solid shaft with said motor, a clutch connecting said solid shaft and said tubular shaft, a stationary flanged sleeve surrounding the end of said solid shaft, a roller flange rigidly mounted on one end of said sleeve, an operating flange rotatably mounted on said sleeve and provided with notches engageable with the rollers on said roller flange and manual means for rotating said operating flange, whereby said clutch is operated.

23. In a charging truck, the combination with a frame, driving wheels for said frame, a steering wheel for said frame, an electric motor and an electric storage battery carried by said frame; of a lifting frame pivoted at its rear end to said frame, lifting wedges, lifting frame supports connected at their lower ends to said lifting frame, roller arms pivotally supported between said wedges and said lifting frame supports and means for operating said wedges whereby said lifting frame may be raised and lowered.

24. In a charging truck, the combination with a frame, driving wheels for said frame, a steering wheel for said frame, an electric motor and an electric storage battery carried by said frame; of a lifting frame pivoted at its rear end to said frame, a stationary shaft, said driving wheels carried by shaft, blocks secured to said stationary shaft and carrying the front end of said frame, slides engageable with said blocks, a yoke secured to the top ends of said slides and provided with bearing pins and downwardly extending arms, lifting wedges carried by said downwardly extending arms, lifting frame supports pivotally connected at their lower ends to said lifting frame and slidably engaged at their upper ends with said bearing pins, roller arms pivotally supported between said wedges and said lifting frame supports, clutch controlled means for operating said wedges and clutch controlled means connecting said electric motor with said driving wheels.

25. A charging truck comprising a main frame, driving wheels, a steering wheel, a lifting frame pivoted to said main frame, motive power means carried by said main frame, a crank shaft for lifting said lifting frame, means for connecting said motive power means with said crank shaft, and means for connecting said crank shaft with said lifting frame.

In testimony whereof, I have hereunto signed my name in the presence of two subscribing witnesses.

THOMAS GRAY.

Witnesses:
J. WM. ELLIS,
WALTER H. KELLEY.